US012597718B2

(12) United States Patent
Yamada et al.

(10) Patent No.: US 12,597,718 B2
(45) Date of Patent: Apr. 7, 2026

(54) TERMINAL UNIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Yamada, Mie (JP); Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 371 days.

(21) Appl. No.: 18/265,388

(22) PCT Filed: Dec. 3, 2021

(86) PCT No.: PCT/JP2021/044550
§ 371 (c)(1),
(2) Date: Jun. 5, 2023

(87) PCT Pub. No.: WO2022/131032
PCT Pub. Date: Jun. 23, 2022

(65) Prior Publication Data

US 2024/0039177 A1 Feb. 1, 2024

(30) Foreign Application Priority Data

Dec. 16, 2020 (JP) ................................ 2020-208149

(51) Int. Cl.
*H01R 4/48* (2006.01)
*H01R 13/11* (2006.01)

(52) U.S. Cl.
CPC .............. *H01R 4/48* (2013.01); *H01R 13/11* (2013.01)

(58) Field of Classification Search
CPC . H01R 4/48; H01R 4/28; H01R 13/11; H01R 13/113; H01R 13/114
(Continued)

(56) References Cited

U.S. PATENT DOCUMENTS 5,281,178 A * 1/1994 Biscorner ............ H01R 13/052 439/850
5,588,884 A * 12/1996 Rudoy .................. H01R 31/02 439/787
(Continued)

FOREIGN PATENT DOCUMENTS

JP 862-176983 U1 11/1987
JP 2017-204396 A 11/2017

*Primary Examiner* — Harshad C Patel
(74) *Attorney, Agent, or Firm* — Venjuris, P.C.

(57) ABSTRACT

A terminal unit of a novel structure is disclosed which can increase a contact area between a contact point portion of a male terminal and a contact point portion of a female terminal while suppressing manufacturing cost. A terminal unit is provided with a male terminal and a female terminal. The male terminal includes a male-side curved contact point portion formed using a flat plate fitting and formed by bending the flat plate fitting in a plate thickness direction. The female terminal includes a tubular insertion portion, into which the male terminal is inserted, and female-side curved contact point portions provided in the insertion portion and configured to contact the male-side curved contact point portion. The male-side curved contact point portion and the female-side curved contact point portions, extend in an inserting direction of the male terminal into the insertion portion of the female terminal.

11 Claims, 4 Drawing Sheets

(58) Field of Classification Search
USPC .......................................................... 439/816
See application file for complete search history.

(56) References Cited

U.S. PATENT DOCUMENTS

| | | | | |
|---|---|---|---|---|
| 6,293,831 | B1 * | 9/2001 | Yamatani | H01R 13/113 439/850 |
| 6,416,340 | B2 * | 7/2002 | Schaefer | H01R 13/187 439/224 |
| 8,419,486 | B2 * | 4/2013 | Tyler | H01R 13/187 439/845 |
| 8,827,754 | B2 * | 9/2014 | Lee | H01R 13/187 439/845 |
| 10,135,167 | B2 * | 11/2018 | Wollitzer | H01R 13/187 |
| 10,256,560 | B2 * | 4/2019 | Fertig | H01R 13/35 |
| 10,389,055 | B1 * | 8/2019 | Lui | H01R 13/187 |
| 2003/0060090 | A1 * | 3/2003 | Allgood | H01R 13/187 439/845 |
| 2015/0056875 | A1 * | 2/2015 | Kobayashi | H01R 13/28 439/884 |
| 2015/0214639 | A1 * | 7/2015 | Sasano | H01R 4/48 439/786 |
| 2018/0034171 | A1 * | 2/2018 | Tyler | H01R 13/187 |
| 2018/0366854 | A1 | 12/2018 | Kobayashi et al. | |
| 2019/0267726 | A1 * | 8/2019 | Kuroiwa | H01R 4/48 |
| 2021/0143561 | A1 | 5/2021 | Nishijima | |
| 2022/0285871 | A1 * | 9/2022 | Nishijima | H01R 13/111 |
| 2022/0294142 | A1 * | 9/2022 | Nishijima | H01R 13/15 |
| 2024/0055790 | A1 * | 2/2024 | Nishijima | H01R 13/113 |

* cited by examiner

TERMINAL UNIT

CROSS REFERENCE TO RELATED APPLICATIONS

This application is a national phase of PCT application No. PCT/JP2021/044550, filed on 3 Dec. 2021, which claims priority from Japanese patent application No. 2020-208149, filed on 16 Dec. 2020, all of which are incorporated herein by reference.

TECHNICAL FIELD

The present disclosure relates to a terminal unit.

BACKGROUND

Patent Document 1 discloses a terminal unit provided with a male terminal including a contact point portion having a cylindrical shape and a female terminal including a plurality of resilient contact point portions arranged in a hollow cylindrical portion into which the contact point portion of the male terminal is inserted. Patent Document 2 discloses a terminal unit provided with a male terminal including a contact point portion having a flat plate shape and a female terminal including an embossed contact point portion to be pressed into contact with the male-side contact point portion.

PRIOR ART DOCUMENT

Patent Document

Patent Document 1: JP 2019-003911 A
Patent Document 2: JP 2017-204396 A

SUMMARY OF THE INVENTION

Problem to be Solved

In the terminal unit of Patent Document 1, the plurality of resilient contact point portions arranged in the hollow cylindrical portion can be brought into contact with the cylindrical contact point portion of the male terminal and a large contact area can be easily secured. However, the cylindrical contact point portion of the male terminal needs to be formed by forging, cutting or the like and an inherent problem has been that manufacturing cost tends to be high. In contrast, it is also considered to reduce cost by changing the shape of the contact point portion of the male terminal to a flat plate shape as in the terminal unit of Patent Document 2. However, since the embossed female-side contact point portion is structured to be brought into point contact with the embossed male-side contact point portion, it may become difficult to secure a contact area between the contact point portion of the male terminal and that of the female terminal as compared to the case where the contact point portion of the male terminal has a cylindrical shape. Thus, a further improvement has been desired.

Accordingly, a terminal unit of a novel structure is disclosed which can increase a contact area between a contact point portion of a male terminal and that of a female terminal while suppressing manufacturing cost.

Means to Solve the Problem

The present disclosure is directed to a terminal unit with a male terminal and a female terminal, the male terminal including a male-side curved contact point portion formed using a flat plate fitting, the male-side curved contact point portion being formed by bending the flat plate fitting in a plate thickness direction, the female terminal including a tubular insertion portion, the male terminal being inserted into the insertion portion, and a female-side curved contact point portion provided in the insertion portion, the female-side curved contact point portion contacting the male-side curved contact point portion, and the male-side curved contact point portion and the female-side curved contact point portion extending in an inserting direction of the male terminal into the insertion portion of the female terminal.

Effect of the Invention

According to the terminal unit of the present disclosure, it is possible to increase a contact area between the contact point portion of the male terminal and that of the female terminal while suppressing manufacturing cost.

DETAILED DESCRIPTION TO EXECUTE THE INVENTION

Description of Embodiments of Present Disclosure

Figure 1:
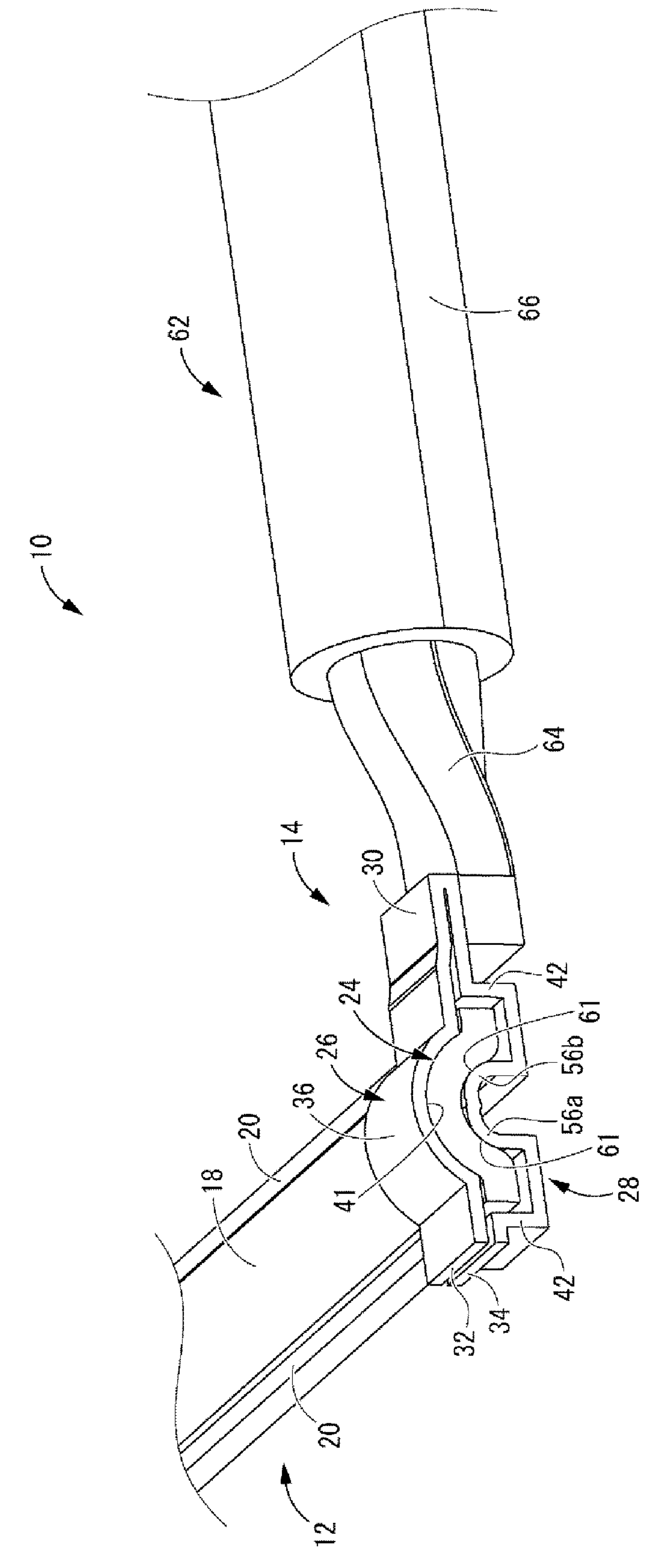
FIG. 1 is a perspective view of a terminal unit according to a first embodiment showing a state where a male terminal is inserted in a female terminal.

First, embodiments of the present disclosure are listed and described.

(1) The terminal unit of the present disclosure is provided with a male terminal and a female terminal, the male terminal including a male-side curved contact point portion formed using a flat plate fitting, the male-side curved contact point portion being formed by bending the flat plate fitting in a plate thickness direction, the female terminal including a tubular insertion portion, the male terminal being inserted into the insertion portion, and a female-side curved contact point portion provided in the insertion portion, the female-side curved contact point portion contacting the male-side curved contact point portion, and the male-side curved contact point portion and the female-side curved contact point portion extending in an inserting direction of the male terminal into the insertion portion of the female terminal.

According to the terminal unit of the present disclosure, the male terminal is constituted by the flat plate fitting, and the male-side curved contact point portion can be provided by curving the flat plate fitting in the plate thickness direction. Thus, the contact point portion of the male terminal has a cylindrical shape and manufacturing cost can be reduced as compared to a conventional structure needed to be formed by forging, cutting or the like. Further, the connection of the male and female terminals is accomplished by the mutual contact of the male-side curved contact point portion provided in the male terminal and the female-side curved contact point portion provided in the female terminal, i.e. by the contact of curved surfaces. Moreover, the male-side curved contact point portion and the female-side curved contact point portion extend in the inserting direction of the male terminal into the insertion portion of the female terminal. Thus, the male-side curved contact point portion and the female-side curved contact point portion can be overlapped over a predetermined length in the inserting direction while being held in line or surface contact with each other. As a result, a contact area between the contact point portions can be increased as compared to a conventional structure in which an embossed female-side contact point portion is brought into point contact with a male-side contact point portion having a flat plate shape. Therefore, contact resistance between the contact point portions and contact pressure between the contact point portions can be reduced and it is also possible to improve the thermal performance of the terminal unit and suppress plating scrape caused by the repeated insertion and withdrawal of the male terminal into and from the female terminal.

(2) Preferably, the flat plate fitting has a rectangular shape and the male-side curved contact point portion convex toward one side in the plate thickness direction is provided in a widthwise central part of the flat plate fitting, the insertion portion includes an upper wall portion and a lower wall portion facing each other across the male terminal, the upper wall portion includes an upper wall curved portion to be overlapped on an outer peripheral surface of the male-side curved contact point portion, and the female-side curved contact point portion is provided on the upper wall curved portion. Since the female-side curved contact point portion is provided on the upper wall curved portion of the insertion portion to be overlapped on the outer peripheral surface of the male-side curved contact point portion having a large area, the contact area between the male and female contact point portions can be more advantageously secured and the female-side curved contact point portion can be designed with a high degree of freedom.

(3) Preferably, in (2) described above, the lower wall portion of the insertion portion includes a supporting protrusion projecting toward an inner peripheral surface of the male-side curved contact point portion, the supporting protrusion includes a lower wall curved portion to be overlapped on the inner peripheral surface of the male-side curved contact point portion, and the female-side curved contact point portion is provided on the lower wall curved portion. The male-side curved contact point portion can be stably sandwiched and held between the upper wall curved portion and the lower wall curved portion. Moreover, since the female-side curved contact point portion can be provided also on the lower wall curved portion to be overlapped on the inner peripheral surface of the male-side curved contact point portion, the contact area between the male and female contact point portions can be more advantageously secured.

(4) Preferably, in (3) described above, the upper wall portion of the female terminal includes the upper wall curved portion curved along the outer peripheral surface of the male-side curved contact point portion and the female-side curved contact point portion comes into contact with a circumferential central part of the outer peripheral surface of the male-side curved contact point portion, and the lower wall portion of the female terminal includes two lower wall curved portions provided at two positions separated toward both end parts from the circumferential central part of the inner peripheral surface of the male-side curved contact point portion and the female-side curved contact point portions come into contact with the inner peripheral surface of both end parts from the circumferential central part.

The female-side curved contact point portion provided on the upper wall curved portion comes into contact with the circumferential central part of the outer peripheral surface of the male-side curved contact point portion on the side of the upper wall portion of the female terminal, and the two female-side curved contact point portions provided on the two lower wall curved portions respectively come into contact with the inner peripheral surface of the male-side curved contact point portion at the two positions separated toward the both end parts from the circumferential central part on the side of the lower wall portion of the female terminal. As a result, the female-side curved contact point portions can be brought into contact, for example, at three points distributed on upper and lower sides of the male-side curved contact point portion and the male and female contact point portions can be more stably held in contact over a wider contact area.

(5) Preferably, in (3) described above, the lower wall portion of the female terminal includes the lower wall curved portion curved along the inner peripheral surface of the male-side curved contact point portion and the female-side curved contact point portion comes into contact with a circumferential central part of the inner peripheral surface of the male-side curved contact point portion, and the upper wall portion of the female terminal includes two upper wall curved portions provided at two positions separated toward both end parts from a circumferential central part of the outer peripheral surface of the male-side curved contact point portion and the female-side curved contact point portions come into contact with the outer peripheral surface of both end parts from the circumferential central part.

The female-side curved contact point portion provided on the lower wall curved portion comes into contact with the circumferential central part of the inner peripheral surface of the male-side curved contact point portion on the side of the lower wall portion of the female terminal, and the two female-side curved contact point portions provided on the two upper wall curved portions respectively come into contact with the outer peripheral surface of the male-side curved contact point portion at the two positions separated toward the both end parts from the circumferential central part on the side of the upper wall portion of the female terminal. As a result, the female-side curved contact point portions can be brought into contact, for example, at three points distributed on the upper and lower sides of the male-side curved contact point portion and the male and female contact point portions can be more stably held in contact over a wider contact area.

(6) Preferably, in any one of (2) to (5) described above, a spring member is provided which biases the upper wall portion toward the lower wall portion. Since the upper wall portion of the insertion portion is biased toward the lower wall portion, the male terminal can be inserted by the upper wall portion being displaced in a direction separating from the lower wall portion against a biasing force of the spring member at the time of the insertion of the male terminal. After the insertion of the male terminal, the female-side curved contact point portions provided on the upper wall portion and the lower wall portion can be pressed into contact with the male-side curved contact point portion by the biasing force of the spring member and the contact resistance between the contact points can be advantageously reduced.

(7) Preferably, in (6) described above, the insertion portion includes the upper wall portion, the lower wall portion and a pair of side wall portions rising from both sides of the lower wall portion, and the upper wall portion is integrally coupled to one of the pair of side wall portions and the spring member is constituted by a folded portion formed by folding the upper wall portion toward the other of the pair of side wall portions. Since the upper wall portion is integrally coupled to the one of the pair of side wall portions, the female terminal is easily handled. Moreover, since the spring member for biasing the upper wall portion of the insertion portion toward the lower wall portion is constituted by the folded portion formed by folding the upper wall portion toward the other of the pair of side wall portions, it is possible to simplify the structure of the female terminal and reduce the cost of the female terminal.

DETAILS OF EMBODIMENTS OF PRESENT DISCLOSURE

Specific examples of a terminal unit of the present disclosure are described below with reference to the drawings. Note that the present disclosure is not limited to these illustrations and is represented by claims and intended to include all changes in the scope of claims and in the meaning and scope of equivalents.

First Embodiment

Hereinafter, a terminal unit 10 of a first embodiment of the present disclosure is described using FIGS. 1 to 3. The terminal unit 10 is provided with a male terminal 12 and a female terminal 14. The male and female terminals 12, 14 are electrically connected by inserting the male terminal 12 into the female terminal 14 to bring the both terminals 12, 14 into contact with each other. Note that, in the following description, a vertical direction means a vertical direction in FIG. 2 and a front-rear direction means a lateral direction in FIG. 2. Further, a lateral direction is a direction orthogonal to the plane of FIG. 2 and means a direction forward and backward of the plane of FIG. 2.

(Male Terminal 12)

The male terminal 12 is formed using an unillustrated flat plate fitting. The flat plate fitting has a rectangular shape, has a predetermined width (dimension in the lateral direction in FIG. 2) and a predetermined thickness (dimension in the vertical direction) and extends straight. The male terminal 12 is electrically conductive and formed of metal low in electrical resistance such as copper, copper alloy, aluminum or aluminum alloy.

The male terminal 12 is provided with a male-side curved contact point portion 18 convex toward one side (upper side) in a plate thickness direction by curving the flat plate fitting in the plate thickness direction. In the first embodiment, the male-side curved contact point portion 18 is provided in a widthwise central part of the flat plate fitting (male terminal 12). Further, flat portions 20, 20 are provided on both widthwise end parts of the male terminal 12. In this way, a recess 22 open downward is formed to extend in a length direction of the flat plate fitting in a widthwise center corresponding to the male-side curved contact point portion 18.

In the male terminal 12, the male-side curved contact point portion 18, the flat portions 20, 20 and the recess 22 are formed over a predetermined length from one end part in the length direction. The other end part in the length direction of the male terminal 12 has a flat plate shape, for example, without providing the male-side curved contact point portion 18, and is provided with a bolt insertion hole and fixed to a terminal portion of a device or fixed to a wire.

Further, in the first embodiment, the male-side curved contact point portion 18 has an arcuate shape. Particularly, in the first embodiment, a curvature of the upper surface (outer peripheral surface) of the male-side curved contact point portion 18 is substantially constant and that of the lower surface (inner peripheral surface) of the male-side curved contact point portion 18 is substantially constant.

(Female Terminal 14)

The female terminal 14 includes a tubular insertion portion 24, into which the male terminal 12 is inserted. The insertion portion 24 is open sideways (on both sides in the lateral direction) and an axial direction of the tubular insertion portion 14 is aligned with the lateral direction. That is, the insertion portion 24 has a predetermined dimension in the lateral direction. Similarly to the male terminal 12, the female terminal 14 is formed of metal low in electrical resistance such as copper, copper alloy, aluminum or aluminum alloy.

In the first embodiment, the tubular insertion portion 24 is divided across an inner hole in the vertical direction and includes an upper wall portion 26 located above the inner hole and a lower wall portion 28 located below the inner hole. As shown in FIGS. 1 and 2, with the male terminal 12 inserted in the inner hole (male terminal insertion gap 46 to be described later) of the insertion portion 24, the upper wall portion 26 and the lower wall portion 28 in the insertion portion 24 are facing each other across the male terminal 12 in the vertical direction.

Further, in the first embodiment, the female terminal 14 is formed by press-working a strip-like member having a constant width, and an intermediate part in a length direction of the strip-like member is bent. In this way, a folded portion 30 is formed in a rear end part of the female terminal 14, and the upper wall portion 26 is provided on one side across the folded portion 30 and the lower wall portion 28 is provided on the other side. That is, the upper wall portion 26 and the lower wall portion 28 are coupled via the folded portion 30 in the rear end part of the female terminal 14, one end part 32 and another end part 34 (respectively constituting a front end part of the female terminal 14) in the length direction of the strip-like member are respectively free ends. As described later, a spring member for biasing the upper wall portion 26 toward the lower wall portion 28 is constituted by this folded portion 30. Note that, in a state before the male terminal 12 is inserted into the insertion portion 24 of the female terminal 14, the one and the other end parts 32, 34 in the length direction of the strip-like member constituting the female terminal 14 may be separated from each other or may be in contact.

An upper wall curved portion 36 convex upward is provided in an intermediate part in the front-rear direction of the upper wall portion 26, and flat portions 38, 38 are provided on both sides in the front-rear direction across the upper wall curved portion 36 in the upper wall portion 26. That is, the flat portions 38, 38 extend outward in the front-rear direction from both ends in the front-rear direction of the upper wall curved portion 36, and an end part of the flat portion 38 extending forward from the upper wall curved portion 36 is the one end 32 in the length direction of the strip-like member constituting the female terminal 14. Further, an end part of the flat portion 38 extending rearward from the upper wall curved portion 36 is connected to the folded portion 30. As described later, since the folded portion 30 is connected to the lower wall portion 28, the upper wall portion 26 is integrally coupled to one (rear side wall portion 42) of a pair of side wall portions 42, 42. By providing the upper wall portion 26 with the upper wall curved portion 36, an upper recess 40 open downward is formed at a position corresponding to the upper wall curved portion 36 in the lower surface of the upper wall portion 26.

In the first embodiment, the upper wall curved portion 36 has an arcuate shape. Particularly, in the first embodiment, a curvature of the lower surface of the upper wall curved portion 36 is substantially constant. The curvature on the lower surface of the upper wall curved portion 36 is equal to or less than that on the upper surface of the male-side curved contact point portion 18 of the male terminal 12. Particularly, in the first embodiment, the curvature on the lower surface of the upper wall curved portion 36 and that on the upper surface of the male-side curved contact point portion 18 are substantially equal. In this way, the upper wall curved portion 36 is overlapped on the outer peripheral surface of the male-side curved contact point portion 18 as described later when the male terminal 12 is inserted into the insertion portion 24 of the female terminal 14. That is, the upper wall curved portion 36 is curved along the outer peripheral surface of the male-side curved contact point portion 18. The upper wall curved portion 36 is provided with an upper female-side curved contact point portion 41.

The pair of side wall portions 42, 42 rising toward the upper wall portion 26 are provided on both sides in the front-rear direction of the lower wall portion 28. A lower recess 44 concave upward is constituted by the lower wall portion 28 and the pair of side wall portions 42, 42. A space formed by the upward convex upper wall curved portion 36 and the upward concave lower recess 44 is the inner hole of the insertion portion 24, and also the male terminal insertion gap 46, into which the male terminal 12 is inserted. That is, in the first embodiment, the insertion portion 24 is configured to include the upper wall curved portion 36, parts of the flat portions 38, 38, the lower wall portion 28 and the side wall portions 42, 42. Further, the flat portions 48, 48 extend outward in the front-rear direction from the upper ends of the side wall portions 42, 42. That is, an end part of the flat portion 48 extending forward from the front side wall portion 42 is the other end part 34 in the length direction of the strip-like member constituting the female terminal 14. Further, an end part of the flat portion 48 extending rearward from the rear side wall portion 42 is connected to the folded portion 30. That is, the folded portion 30 is formed by folding the strip-like member constituting the female terminal 14 in a direction to bring the one end part 32 and the other end part 34 in the length direction closer to each other. In other words, the folded portion 30 is formed by folding the upper wall portion 26 located on the side of the one end part 32 in the length direction toward the other (front side wall portion 42) of the pair of side wall portions 42, 42 located on the side of the other end part 34 in the length direction.

In the first embodiment, a supporting protrusion 50 projecting upward, i.e. toward the inner peripheral surface of the male-side curved contact point portion 18 of the male terminal 12 (inner surface of the recess 22) when the male terminal 12 is inserted into the insertion portion 24 of the female terminal 14 is provided in an intermediate part in the front-rear direction of the lower wall portion 28. In short, the supporting protrusion 50 projecting upward in the lower wall portion 28 projects inwardly of the male terminal insertion gap 46. In this way, a pair of bottom walls 52, 52 are formed on both sides in the front-rear direction of the supporting protrusion 50 in the lower wall portion 28. Further, inner vertical walls 54, 54 rising upward are provided on inner end parts in the front-rear direction of the pair of bottom walls 52, 52. The upper ends of the inner vertical walls 54, 54 are coupled by lower wall curved portions 56 curved to be convex upward. That is, in the first embodiment, the supporting protrusion 50 is configured to include the pair of inner vertical walls 54, 54 and the lower wall curved portions 56. The aforementioned side wall portions 42, 42 are provided on outer end parts in the front-rear direction of the bottom walls 52, 52. Therefore, in the lower recess 44, rectangular recesses 58, 58 each surrounded by the bottom wall 52, the side wall portion 42 and the inner vertical wall 54 are formed to be open upward on both sides in the front-rear direction of the supporting protrusion 50.

Particularly, in the first embodiment, the lower wall curved portions 56 are provided at two positions in the front-rear direction, i.e. the front lower wall curved portion **56*a* and the rear lower wall curved portion 56*b* are provided. Each of these front and rear lower wall curved portions 56*a*, 56*b* has an arcuate shape and has a substantially constant curvature. In this way, the front and rear lower wall curved portions 56*a*, 56*b* formed into an arcuate shape project inward in the front-rear direction from the upper ends of the inner vertical walls 54, 54 and are butted against each other. As a result, in the first embodiment, a dent 60 recessed slightly downward is formed as the front and rear lower wall curved portions 56*a*, 56*b* are coupled in a center in the front-rear direction of the upper surface of the supporting protrusion 50**.

A curvature on the upper surface (outer peripheral surface) of the lower wall curved portion 56 is equal to or more than that on the lower surface of the male-side curved contact point portion 18 of the male terminal 12 (inner surface of the recess 22). In the first embodiment, each of the curvatures on the upper surfaces (peripheral surfaces) of the front and rear lower wall curved portions **56*a*, 56*b* is larger than that on the lower surface (inner peripheral surface) of the male-side curved contact point portion 18. In this way, the lower wall curved portions 56 are overlapped on the inner peripheral surface of the male-side curved contact point portion 18 as described later when the male terminal 12 is inserted into the insertion portion 24 of the female terminal 14. That is, the lower wall curved portions 56 are provided with lower female-side curved contact point portions 61. Particularly, in the first embodiment, the front and rear lower wall curved portions 56*a*, 56*b* are provided at two positions separated toward both circumferential end parts from a circumferential central part of the inner peripheral surface of the male-side curved contact point portion 18. Each of these front and rear lower wall curved portions 56*a*, 56*b* is provided with the lower female-side curved contact point portion 61**.

A wire 62 is fixed to the female terminal 14 shaped as described above. Specifically, the wire 62 is such a coated wire that a core wire 64 is covered by an insulation coating 66. The core wire 64 exposed by stripping the insulation coating 66 in an end part of the wire 62 is fixed to the lower surface of the folded portion 30 in the female terminal 14. Note that a method for fixing the core wire 64 to the folded portion 30 is not limited and may be, for example, crimping, welding, fusion or the like. Further, the core wire 64 may not be fixed to the folded portion 30 and can be, for example, fixed at a suitable position in a part (e.g. flat portions 38, 48) extending from the upper wall portion 26 and the lower wall portion 28. Note that the female terminal 14 may be fixed to the terminal portion of the device, instead of the wire 62, by a bolt or the like.

(Connection of Male Terminal 12 and Female Terminal 14)

Figure 2:
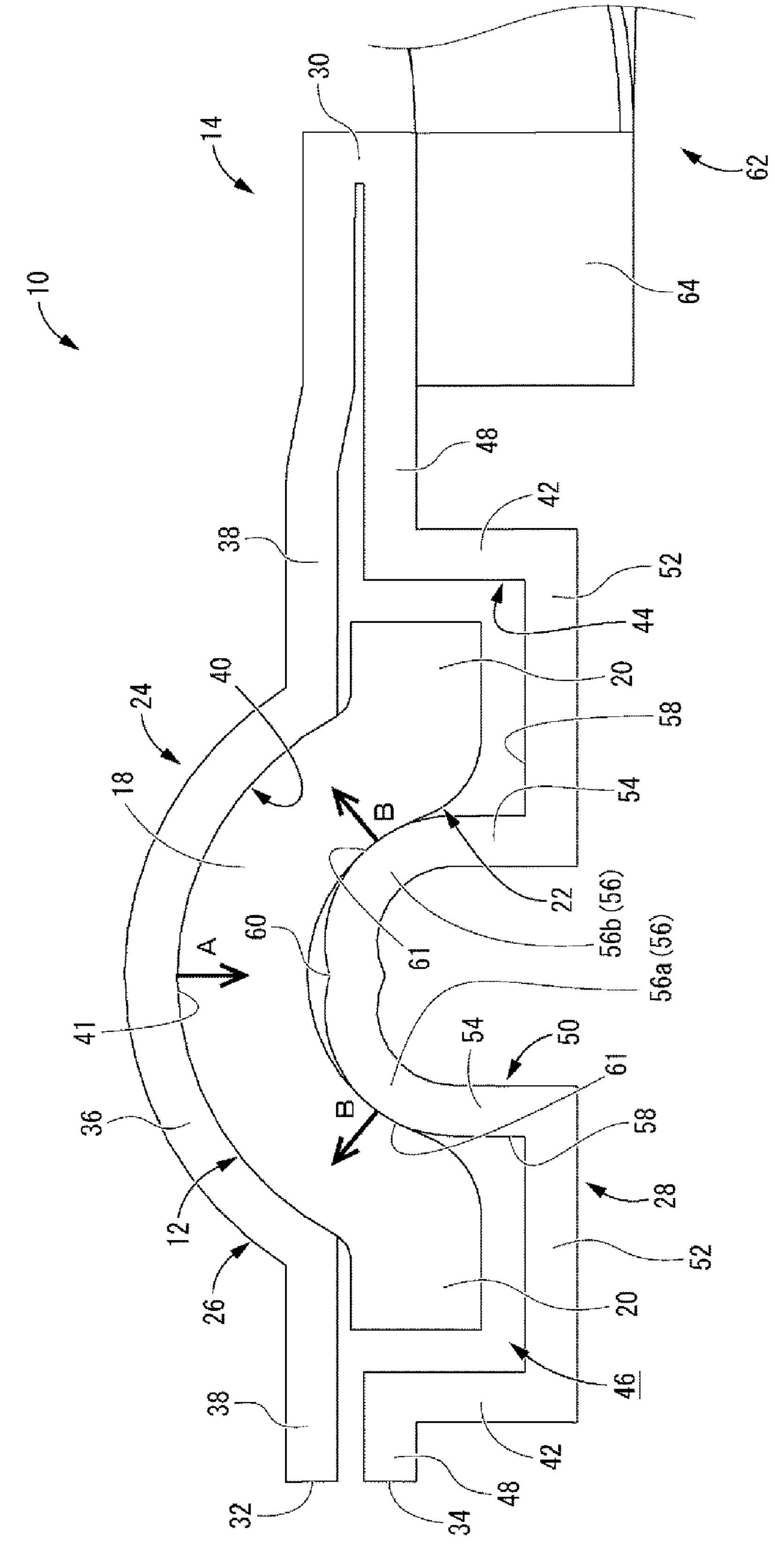
FIG. 2 is a side view enlargedly showing an essential part of the terminal unit shown in FIG. 1.

One end side in the length direction of the male terminal 12 is inserted into the insertion portion 24 (male terminal insertion gap 46) of the female terminal 14 from a side (e.g. a left side as shown in FIG. 1). Here, the male-side curved contact point portion 18 of the male terminal 12 and the insertion portion 24 (upper female-side curved contact point portion 41 and lower female-side curved contact point portions 61) of the female terminal 14 extend over a predetermined length in an inserting direction (lateral direction) of the male terminal 12 into the insertion portion 24 of the female terminal 14. The curvature on the outer peripheral surface of the male-side curved contact point portion 18 of the male terminal 12 is larger than that on the inner peripheral surface of the upper wall curved portion 36 of the female terminal 14. Thus, the male-side curved contact point portion 18 enters the upper recess 40 formed by the upper wall curved portion 36, and the upper wall curved portion 36 and the outer peripheral surface of the male-side curved contact point portion 18 are overlapped on each other. Further, since the inner peripheral surface of the upper wall curved portion 36 and the outer peripheral surface of the male-side curved contact point portion 18 have both an arcuate shape having a substantially constant curvature, the inner peripheral surface of the upper wall curved portion 36 and the outer peripheral surface of the male-side curved contact point portion 18 respectively come into contact with each other in the circumferential central part. Therefore, in the upper wall curved portion 36, the circumferential central part serves as the upper female-side curved contact point portion 41. Particularly, in the first embodiment, the curvature on the inner peripheral surface of the upper wall curved portion 36 is substantially equal to that on the outer peripheral surface of the male-side curved contact point portion 18 and the substantially entire upper wall curved portion 36 serves as the upper female-side curved contact point portion 41.

Further, the curvature on the inner peripheral surface of the male-side curved contact point portion 18 of the male terminal 12 is smaller than those on the outer peripheral surfaces of the lower wall curved portions 56 of the female terminal 14. Thus, the supporting protrusion 50 enters the recess 22 formed by the male-side curved contact point portion 18, and the lower wall curved portions 56 and the inner peripheral surface of the male-side curved contact point portion 18 are overlapped on each other. In the first embodiment, the front and rear lower wall curved portions 56*a*, 56*b* are provided in the supporting protrusion 50, and the curvatures on the outer peripheral surfaces of the front and rear lower wall curved portions 56*a*, 56*b* are larger than that on the inner peripheral surface of the male-side curved contact point portion 18. In this way, the outer peripheral surfaces of the front and rear lower wall curved portions 56*a*, 56*b* come into contact with the inner peripheral surface of the male-side curved contact point portion 18 at positions separated toward the both circumferential end parts from the circumferential central part. Therefore, the lower female-side curved contact point portions 61, 61 provided on the front and rear lower wall curved portions 56*a*, 56*b* come into contact with the inner peripheral surface of the male-side curved contact point portion 18 at two positions separated toward the both circumferential end parts from the circumferential central part.

Further, the supporting protrusion 50 of the female terminal 14 enters the recess 22 of the male terminal 12 and the flat portions 20, 20 located on the both sides in the front-rear direction of the recess 22 in the male terminal 12 enter the rectangular recesses 58, 58 located on the both sides in the front-rear direction of the supporting protrusion 50 in the female terminal 14. Note that, in the first embodiment, the flat portions 20, 20 contact none of the flat portions 38, 38 located on the both sides of the upper wall curved portion 36, the side wall portions 42, 42 constituting the rectangular recesses 58, 58, the inner vertical walls 54, 54 and the bottom walls 52, 52. By the entrance of the flat portions 20, 20 of the male terminal 12 into the rectangular recesses 58, 58 of the female terminal 14 in this way, a positioning effect is achieved when the male terminal 12 is inserted into the insertion portion 24 of the female terminal 14.

Figure 3:
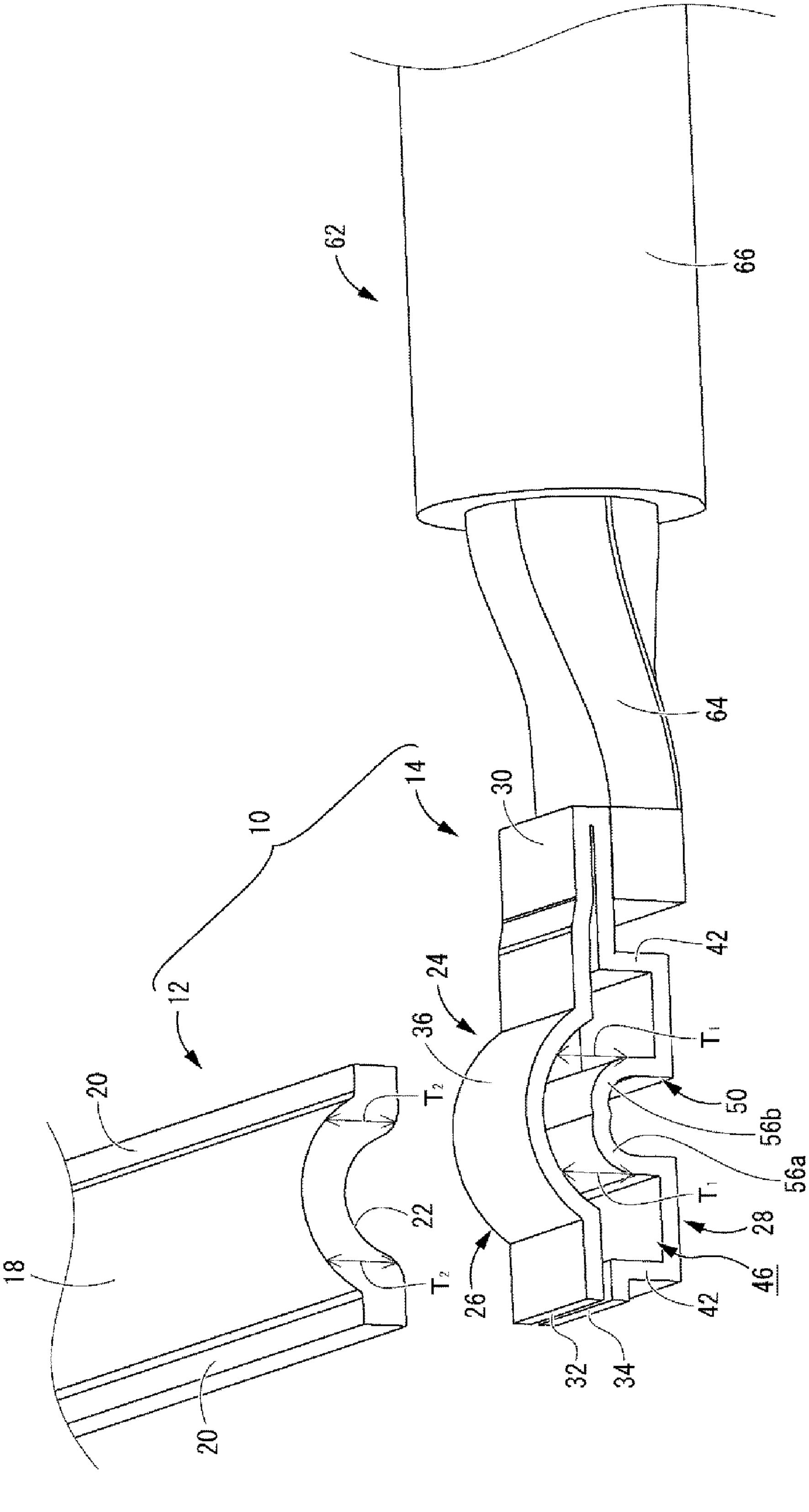
FIG. 3 is a perspective view of the terminal unit according to the first embodiment showing a state where the male and female terminals are separated.

Here, as shown in FIG. 3, in the state before the male terminal 12 is inserted into the insertion portion 24 of the female terminal 14, a minimum vertical dimension $T_1$ (see FIG. 3) between the upper wall curved portion 36 and the lower wall curved portions 56 (front and rear lower wall curved portions 56*a*, 56*b*) is substantially equal to or slightly smaller than a vertical dimension $T_2$ (see FIG. 3) of the male terminal 12 at corresponding positions. In this way, when the male terminal 12 is inserted into the insertion portion 24 of the female terminal 14 (male terminal insertion gap 46), the upper wall portion 26 and the lower wall portion 28 of the female terminal 14 are vertically pushed and widened in separating directions, and the folded portion 30 connected to the upper wall portion 26 and the lower wall portion 28 via the flat portions 38, 48 is resiliently deformed to be opened. As a result, biasing forces based on a resilient restoring force of the folded portion 30 are applied to the upper wall portion 26 and the lower wall portion 28, and the upper wall portion 26 and the lower wall portion 28 are biased in directions approaching each other. That is, in the first embodiment, a spring member for biasing the upper wall portion 26 toward the lower wall portion 28 is constituted by the folded portion 30. By applying the biasing forces to the upper wall portion 26 and the lower wall portion 28 in the directions approaching each other, the male terminal 12 is held between the upper wall portion 26 and the lower wall portion 28 with a relatively high contact pressure in the insertion portion 24 (male terminal insertion gap 46) of the female terminal 14.

As described above, in the first embodiment, the male and female terminals 12, 14 come into contact with each other in the circumferential central part of the outer peripheral surface of the male-side curved contact point portion 18 on the upper side and at the two positions separated toward the both circumferential end parts from the circumferential central part of the inner peripheral surface of the male-side curved contact point portion 18 on the lower side. In this way, a force for holding the male terminal 12 by the upper wall portion 26 acts from the upper side toward the lower side as shown by an arrow A in FIG. 2, and forces for holding the male terminal 12 by the lower wall portion 28 (front and rear lower wall curved portions 56*a*, 56*b*) act in directions inclined outward in the front-rear direction with respect to an upward direction as shown by arrows B in FIG. 2. As just described, in the first embodiment, the holding force from above and the holding forces from below for holding the male terminal 12 by the female terminal 14 are not opposed to each other.

In the terminal unit 10 of the first embodiment, the male-side curved contact point portion 18 serving as a contact point portion in the male terminal 12 is provided over the predetermined length. Further, since the female terminal 14 has a predetermined lateral dimension, the female-side curved contact point portions 41, 61 serving as contact point portions in the female terminal 14 are also provided over the predetermined length. Accordingly, when the male terminal 12 is inserted into the female terminal 14, the male terminal 12 is brought into line contact (or surface contact if the male-side curved contact point portion 18 and the female-side curved contact point portions 41, 61 are provided over a predetermined region) with the female terminal 14. Therefore, a contact area can be increased as compared to the case where male and female terminals are brought into point contact with each other like a conventional structure. In this way, contact resistance between the contact point portions and contact pressure between the contact point portions can be reduced, and it is suppressed that plating is peeled off from the surfaces of the male and female terminals 12, 14 as the male terminal 12 is repeatedly inserted into and withdrawn from the female terminal 14. Further, thermal performance can be improved and a temperature rise of the terminal unit 10 provided with the male and female terminals 12, 14 can be suppressed. As a result, the adhesion of the plating associated with a high temperature of the terminal unit 10 is also effectively prevented.

Further, since the male terminal 12 can be formed merely by curving the flat plate fitting, a complicated process and a large-scale facility are not necessary in manufacturing the male terminal 12 and the manufacturing cost of the male terminal 12 and, eventually, the terminal unit 10 can be reduced.

The upper wall portion 26 constituting the insertion portion 24 is provided with the upper wall curved portion 36, and this upper wall curved portion 36 is provided with the female-side curved contact point portion 41 to be overlapped on the outer peripheral surface of the male-side curved contact point portion 18 of the male terminal 12. Particularly, the female-side curved contact point portion 41 to be brought into contact with the male-side curved contact point portion 18 can be formed to have a predetermined circumferential dimension by setting the curvature on the outer peripheral surface of the male-side curved contact point portion 18 and that on the inner peripheral surface of the upper wall curved portion 36 substantially equal to each other. In this way, the contact area between the male and female terminals 12, 14 when the male terminal 12 is inserted into the female terminal 14 can be further increased.

The supporting protrusion 50 of the lower wall portion 28 constituting the insertion portion 24 is provided with the lower wall curved portions 56, and these lower wall curved portions 56 are provided with the female-side curved contact point portions 61, 61 to be overlapped on the inner peripheral surface of the male-side curved contact point portion 18 of the male terminal 12. In this way, the male terminal 12 can be stably held in the vertical direction in the female terminal 14. Particularly, in the first embodiment, the supporting protrusion 50 is provided with the front and rear lower wall curved portions **56*a*, 56*b*, and the respective front and rear lower wall curved portions 56*a*, 56*b* are provided with the female-side curved contact point portions 61, 61. In this way, together with the upper female-side curved contact point portion 41, the male terminal 12 is held at three positions in the insertion portion 24. Thus, position shifts of the male and female terminals 12, 14 after the insertion of the male terminal 12 into the female terminal 14** are effectively prevented.

Particularly, in the first embodiment, the direction of the holding force applied to the male terminal 12 by the upper wall portion 26 and those of the holding forces applied to the male terminal 12 by the lower wall portion 28 are not opposed to each other. In this way, the concentration of the holding forces at a specific position in the male terminal 12 is avoided and plating scrape associated with the repeated insertion and withdrawal of the male terminal 12 into and from the female terminal 14 is effectively prevented.

The terminal unit 10 is provided with the spring member (folded portion 30), and the upper wall portion 26 is biased toward the lower wall portion 28 with the male terminal 12 inserted in the female terminal 14. In this way, a sufficient contact pressure between the male and female terminals 12, 14 can be ensured, and the electrical connection of the male and female terminals 12, 14 can be stably maintained. That is, by providing the terminal unit 10 with the spring member (folded portion 30), both an increase of the contact area between the male and female terminals 12, 14 and the ensuring of the contact pressure between the male and female terminals 12, 14 can be achieved.

Particularly, since the above spring member (folded portion 30) is formed by folding the strip-like member constituting the female terminal 14, a spring member separate from the terminal unit 10 needs not be separately provided and effects of reducing the number of components and the manufacturing cost and simplifying the structure are achieved.

Second Embodiment

Figure 4:
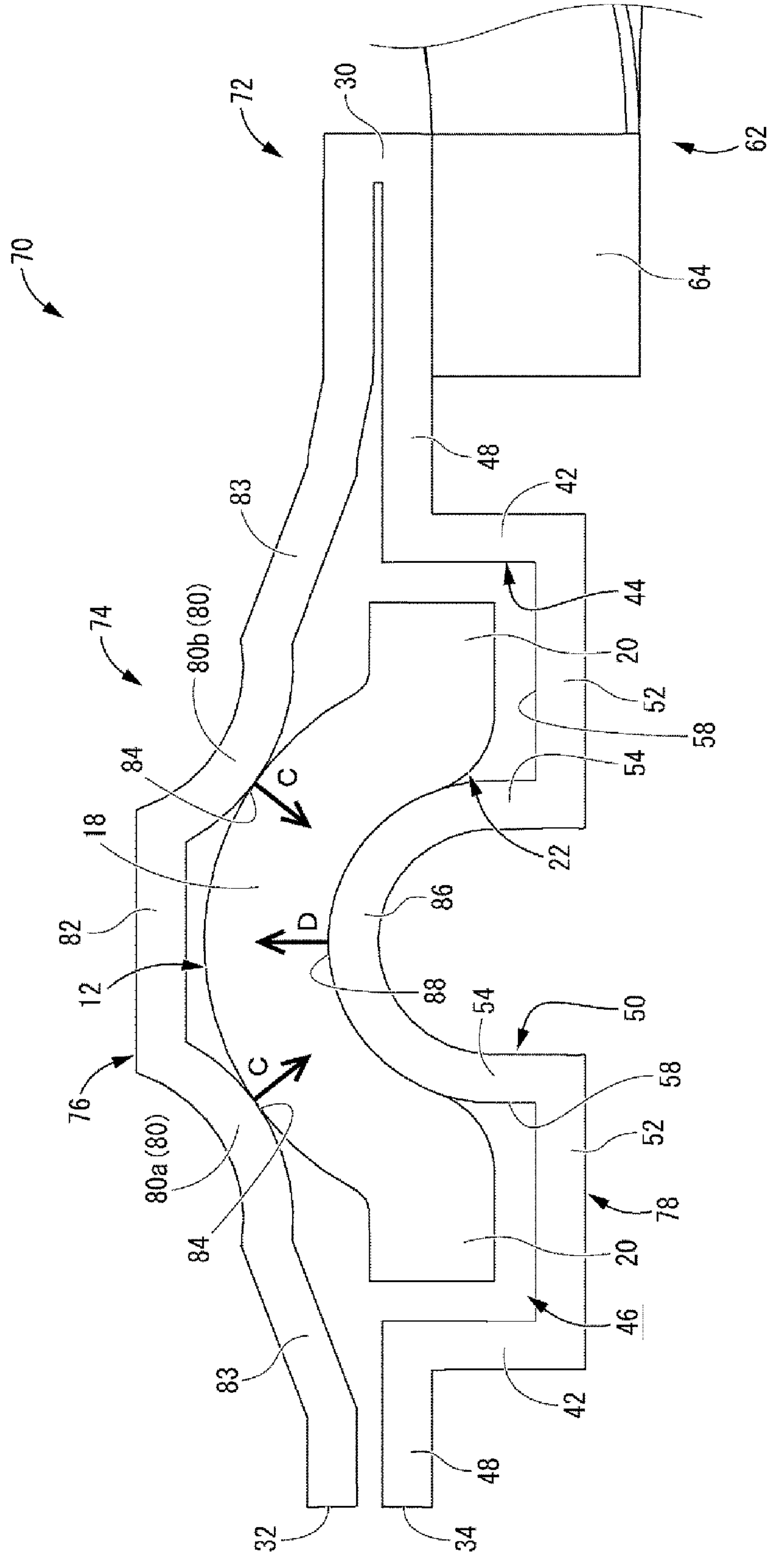
FIG. 4 is a side view corresponding to FIG. 2 enlargedly showing an essential part of a terminal unit according to a second embodiment.

A terminal unit 70 of a second embodiment of the present disclosure is described below using FIG. 4. Since the terminal unit 70 in the second embodiment differs from the terminal unit 10 of the first embodiment only in the structure of a female terminal 72, an essential part of the terminal unit 70 is enlargedly shown in FIG. 4. Note that, in the terminal unit 70 of the second embodiment, substantially the same members or parts as those of the terminal unit 10 of the first embodiment are denoted by the same reference signs as in the first embodiment in FIG. 4 and not described in detail.

(Female Terminal 72)

In the female terminal 72, a tubular insertion portion 74, into which a male terminal 12 is inserted, includes an upper wall portion 76 and a lower wall portion 78 facing each other across the male terminal 12. The upper wall portion 76 includes upper wall curved portions 80 to be overlapped on the outer peripheral surface of a male-side curved contact point portion 18 of the male terminal 12. In the second embodiment, the upper wall curved portions 80 are convex downward. Particularly, in the second embodiment, the upper wall curved portions 80 are provided at two positions in the front-rear direction, i.e. the front upper wall curved portion **80*a* and the rear upper wall curved portion 80*b* are provided. Each of these front and rear upper wall curved portions 80*a*, 80*b* has an arcuate shape and has a substantially constant curvature. The front and rear upper wall curved portions 80*a*, 80*b* are separated from each other in the front-rear direction and coupled to each other by a flat portion 82**.

Further, inclined portions 83 are respectively connected to outer end parts in the front-rear direction of the front and rear upper wall curved portions **80*a*, 80*b*, and the upper wall portion 76 is connected to the folded portion 30 via the inclined portion 83 connected behind the rear upper wall curved portion 80*b*. As described later, when the male terminal 12 is inserted into the female terminal 72, the upper wall portion 76 contacts the outer peripheral surface of the male-side curved contact point portion 18 at two positions of the front and rear upper wall curved portions 80*a*, 80*b*. In short, the front and rear upper wall curved portions 80*a*, 80*b* are provided at two positions separated toward both circumferential end parts from a circumferential central part of the outer peripheral surface of the male-side curved contact point portion 18. These front and rear upper wall curved portions 80*a*, 80*b* are respectively provided with upper female-side curved contact point portions 84, 84. Note that the flat portion 82 located between the front and rear upper wall curved portions 80***a*, 80*b* does not contact the outer peripheral surface of the male-side curved contact point portion 18.

The lower wall portion 78 includes a supporting protrusion 50 as in the first embodiment, but a lower wall curved portion 86 provided in the supporting protrusion 50 is formed into an arcuate shape having a substantially constant curvature in the second embodiment. Particularly, in the second embodiment, a curvature on the inner peripheral surface of the male-side curved contact point portion 18 and that on the outer peripheral surface of the lower wall curved portion 86 are substantially equal. In this way, substantially the entire lower wall curved portion 86 of the lower wall portion 78 contacts the inner peripheral surface of the male-side curved contact point portion 18 as described later when the male terminal 12 is inserted into the female terminal 72. That is, the lower wall curved portion 86 is curved along the inner peripheral surface of the male-side curved contact point portion 18. This lower wall curved portion 86 is provided with a lower female-side curved contact point portion 88.

(Connection of Male Terminal 12 and Female Terminal 72)

One end side in a length direction of the male terminal 12 is inserted into the insertion portion 74 of the female terminal 72 from a side. Here, the front and rear upper wall curved portions 80*a*, 80*b* are separated from each other in the front-rear direction and shaped to be convex downward. In this way, the female-side curved contact point portions 84, 84 in the front and rear upper wall curved portions 80*a*, 80*b* contact the outer peripheral surface of the male-side curved contact point portion 18 at the two positions separated toward the both circumferential end parts from the circumferential central part. Further, since both the outer peripheral surface of the lower wall curved portion 86 and the inner peripheral surface of the male-side curved contact point portion 18 have an arcuate shape having the substantially constant curvature, the outer peripheral surface of the lower wall curved portion 86 and the inner peripheral surface of the male-side curved contact point portion 18 respectively come into contact with each other in the circumferential central parts. Therefore, in the lower wall curved portion 86, the circumferential central part serves as the lower female-side curved contact point portion 88. Particularly, in the second embodiment, the curvature on the outer peripheral surface of the lower wall curved portion 86 is substantially equal to that on the inner peripheral surface of the male-side curved contact point portion 18 and substantially the entire lower wall curved portion 86 serves as the lower female-side curved contact point portion 88.

As described above, in the second embodiment, the male and female terminals 12, 14 are in contact at two positions separated toward the both circumferential end parts from the circumferential central part of the outer peripheral surface of the male-side curved contact point portion 18 on an upper side and in the circumferential central part of the inner peripheral surface of the male-side curved contact point portion 18 on a lower side. In this way, forces for holding the male terminal 12 by the upper wall portion 76 (front and rear upper wall curved portions 80*a*, 80*b*) act in directions inclined inward in the front-rear direction with respect to a downward direction as shown by arrows C in FIG. 4, and a force for holding the male terminal 12 by the lower wall portion 78 acts from the lower side toward the upper side as shown by an arrow D in FIG. 4. As just described, also in the second embodiment, the holding forces from above and the holding force from below for holding the male terminal 12 by the female terminal 72 are not opposed to each other.

Also in the terminal unit 70 of the second embodiment, the male-side curved contact point portion 18 serving as a contact point portion in the male terminal 12 and the female-side curved contact point portions 84, 84 serving as upper contact point portions in the female terminal 14 come into line contact, and the male-side curved contact point portion 18 and the female-side curved contact point portion 88 serving as a lower contact point portion in the female terminal 14 come into surface contact. In this way, a contact area is increased as compared to the case of point contact as in the conventional structure.

Further, since the male terminal 12 is held at three positions in the insertion portion 74 also in the terminal unit 70 of the second embodiment, position shifts of the male and female terminals 12, 72 after the insertion of the male terminal 12 into the female terminal 72 are effectively prevented. Particularly, the directions of the holding forces applied to the male terminal 12 by the upper wall portion 76 and that of the holding force applied to the male terminal 12 by the lower wall portion 78 are not opposed to each other. In this way, the concentration of the holding forces at a specific position in the male terminal 12 is avoided and plating scrape associated with the repeated insertion and withdrawal of the male terminal 12 into and from the female terminal 72 is effectively prevented.

<Modifications>

Although the first and second embodiments have been described in detail as specific examples of the present disclosure above, the present disclosure is not limited by this specific description. The present disclosure encompasses modifications, improvements and the like within such a range that the aim of the present disclosure can be achieved. For example, the following modifications of the embodiments are also included in the technical scope of the present disclosure.

(1) Although the curvature of the outer peripheral surface of the male-side curved contact point portion 18 and that of the inner peripheral surface of the upper wall curved portion 36 are equal and the female-side curved contact point portion 41 is provided in the form of a surface over a predetermined region from the circumferential central part toward the both circumferential end sides of the upper wall curved portion 36 in the above first embodiment, there is no limitation to this mode. In the above first embodiment, the curvature of the outer peripheral surface of the male-side curved contact point portion may be larger than that of the inner peripheral surface of the upper wall curved portion and the female-side curved contact point portion may be provided in the form of a line in the circumferential central part of the upper wall curved portion. Further, although the curvature of the inner peripheral surface of the male-side curved contact point portion 18 and that of the outer peripheral surface of the lower wall curved portion 86 are equal and the female-side curved contact point portion 88 is provided in the form of a surface over a predetermined region from the circumferential central part toward the both circumferential end sides of the lower wall curved portion 86 in the above second embodiment, there is no limitation to this mode. In the above second embodiment, the curvature of the inner peripheral surface of the male-side curved contact point portion may be smaller than that of the outer peripheral surface of the lower wall curved portion and the female-side curved contact point portion may be provided in the form of a line in the circumferential central part of the lower wall curved portion.

(2) Any of the upper and lower female-side curved contact point portions 41, 61, 84 and 88 in the female terminal 14 comes into line (or surface) contact with the outer and inner peripheral surfaces of the male-side curved contact point portion 18 in the above first and second embodiments, there is no limitation to this mode. If one of the upper and lower female-side curved contact point portions come into line (or surface) contact, the other of the upper and lower female-side curved contact point portions may come into point contact. That is, for example, in the first embodiment, the supporting protrusion 50 (front and rear lower wall curved portions 56*a*, 56*b*) needs not be provided, and hemispherical protrusions projecting upward may be provided on the bottom walls of the lower wall portion and may come into point contact with the lower surfaces of the flat portions in both widthwise end parts of the male terminal. Similarly, in the second embodiment, the front and rear upper wall curved portions 80*a*, 80*b* in the upper wall portion 76 are not necessary, and a hemispherical protrusion projecting downward may be provided on the upper wall portion and come into point contact with the male terminal.

(3) Although both the upper wall portion 26, 76 and the lower wall portion 28, 78 are provided with the upper wall curved portion(s) 36, 80 (front and rear upper wall curved portions 80*a*, 80*b*) and the lower wall curved portion(s) 56 (front and rear lower wall curved portions 56*a*, 56*b*), 86 in the above first and second embodiments, these curved portions need not be provided. For example, one of the upper and lower wall portions may be provided with a rectangular recess open downward and upward, and a female-side curved contact point portion provided on the other of the upper and lower wall portions may come into line (or surface) contact with the male-side curved contact point portion.

(4) The curvatures of the outer and inner peripheral surfaces of the male-side curved contact point portion, the inner peripheral surface of the upper wall curved portion and the outer peripheral surface of the lower wall curved portion are not limited and may be set such that any one of the upper female-side curved contact point portion(s) and the lower female-side curved contact point portion(s) come into line contact with the male-side curved contact point portion. Further, each of the curvatures of the outer and inner peripheral surfaces of the male-side curved contact point portion, the inner peripheral surface of the upper wall curved portion and the outer peripheral surface of the lower wall curved portion needs not be constant and may be partially different, and each of the peripheral surfaces may be provided with a flat extending part.

(5) Although the widthwise central part of the flat plate fitting constituting the male terminal 12 is curved to form the male-side curved contact point portion 18 and the both widthwise end parts of the male terminal 12 serve as the flat portions 20, 20 in the above first and second embodiments, the flat portions need not be provided and the male terminal may be entirely formed into a curved shape.

(6) The male and female terminals are not limited to those to be held in contact at three points, and the direction of the holding force applied to the male-side curved contact point portion from the upper wall portion and that of the holding force applied to the male-side curved contact point portion from the lower wall portion may be opposed to each other.

(7) Although the male-side curved contact point portion is provided over the predetermined length from one end in the length direction in the male terminal, the male-side curved contact point portion may be provided at least only in a part to be inserted into the female terminal.

(8) Although the upper wall portion 26, 76 and the lower wall portion 28, 78 are integrally formed by bending the strip-like member constituting the female terminal 14 in the above first and second embodiments, the upper wall portion and the lower wall portion may be constituted by members separate from each other. In that case, spring members for biasing the upper and lower wall portions to each other are suitably provided. Coil springs, annular resilient bodies and the like are adopted as such spring members and can be mounted on both sides in the front-rear direction of the insertion portion. By inserting the male terminal into the insertion portion against biasing forces of the spring members, the female terminal can be in contact with the male terminal with a predetermined contact pressure.

LIST OF REFERENCE NUMERALS

10 terminal unit (first embodiment)
12 male terminal
14 female terminal
18 male-side curved contact point portion
20 flat portion
22 recess
24 insertion portion
26 upper wall portion
28 lower wall portion
30 folded portion (spring member)
32 one end part
34 other end part
36 upper wall curved portion
38 flat portion
40 upper recess
41 (upper) female-side curved contact point portion
42 side wall portion
44 lower recess
46 male terminal insertion gap
48 flat portion
50 supporting protrusion
52 bottom wall
54 inner vertical wall
56 lower wall curved portion
56*a* front lower wall curved portion
56*b* rear lower wall curved portion
58 rectangular recess
60 dent
61 (lower) female-side curved contact point portion
62 wire
64 core wire
66 insulation coating
70 terminal unit (second embodiment)
72 female terminal
74 insertion portion
76 upper wall portion
78 lower wall portion
80 upper wall curved portion
80*a* front upper wall curved portion
80*b* rear upper wall curved portion
82 flat portion
83 inclined portion
84 (upper) female-side curved contact point portion
86 lower wall curved portion
88 (lower) female-side curved contact point portion

What is claimed is:

1. A A terminal unit, comprising:
a male terminal; and
a female terminal, the male terminal including a male-side curved contact point portion formed using a flat plate fitting, the male-side curved contact point portion being formed by bending the flat plate fitting in a plate thickness direction, the female terminal including a tubular insertion portion, the male terminal being inserted into the insertion portion, and a female-side curved contact point portion provided in the insertion portion, the female-side curved contact point portion contacting the male-side curved contact point portion, the male-side curved contact point portion and the female-side curved contact point portion extending in an inserting direction of the male terminal into the insertion portion of the female terminal, and the male terminal further comprises planar flat portions extending in opposite directions from both widthwise ends of the male-side curved contact point portion.

2. The terminal unit of claim 1, wherein:

the flat plate fitting has a rectangular shape and the male-side curved contact point portion convex toward one side in the plate thickness direction is provided in a widthwise central part of the flat plate fitting, the insertion portion includes an upper wall portion and a lower wall portion facing each other across the male terminal, the upper wall portion includes an upper wall curved portion to be overlapped on an outer peripheral surface of the male-side curved contact point portion, and the female-side curved contact point portion is provided on the upper wall curved portion.

3. The terminal unit of claim 2, wherein:

the lower wall portion of the insertion portion includes a supporting protrusion projecting toward an inner peripheral surface of the male-side curved contact point portion, the supporting protrusion includes a lower wall curved portion to be overlapped on the inner peripheral surface of the male-side curved contact point portion, and the female-side curved contact point portion is provided on the lower wall curved portion.

4. The terminal unit of claim 3, wherein:

the upper wall portion of the female terminal includes the upper wall curved portion curved along the outer peripheral surface of the male-side curved contact point portion and the female-side curved contact point portion comes into contact with a circumferential central part of the outer peripheral surface of the male-side curved contact point portion, and the lower wall portion of the female terminal includes two lower wall curved portions provided at two positions separated toward both end parts from the circumferential central part of the inner peripheral surface of the male-side curved contact point portion and the female-side curved contact point portions come into contact with the inner peripheral surface of the male-side curved contact point portion at the two positions separated toward the both end parts from the circumferential central part.

5. The terminal unit of claim 3, wherein:

the lower wall portion of the female terminal includes the lower wall curved portion curved along the inner peripheral surface of the male-side curved contact point portion and the female-side curved contact point portion comes into contact with a circumferential central part of the inner peripheral surface of the male-side curved contact point portion, and the upper wall portion of the female terminal includes two upper wall curved portions provided at two positions separated toward both end parts from a circumferential central part of the outer peripheral surface of the male-side curved contact point portion and the female-side curved contact point portions come into contact with the outer peripheral surface of the male-side curved contact point portion at the two positions separated toward the both end parts from the circumferential central part.

6. The terminal unit of claim 2, comprising a spring member for biasing the upper wall portion toward the lower wall portion.

7. The terminal unit of claim 6, wherein:

the insertion portion includes the upper wall portion, the lower wall portion and a pair of side wall portions rising from both sides of the lower wall portion, and the upper wall portion is integrally coupled to one of the pair of side wall portions and the spring member is constituted by a folded portion formed by folding the upper wall portion toward the other of the pair of side wall portions.

8. The terminal unit of claim 1, wherein:

the flat portions are structurally and functionally distinct from the curved contact point portion.

9. The terminal unit of claim 1, wherein:

the male-side curved contact point portion is arc-shaped.

10. The terminal unit of claim 1, wherein:

the male-side curved contact point portion has an arc shape corresponding to a curvature of the female-side curved contact point portion.

11. A terminal unit, comprising:

a male terminal; and a female terminal, the male terminal including a male-side curved contact point portion formed using a flat plate fitting, the male-side curved contact point portion being formed by bending the flat plate fitting in a plate thickness direction, the female terminal including a tubular insertion portion, the male terminal being inserted into the insertion portion, and a female-side curved contact point portion provided in the insertion portion, the female-side curved contact point portion contacting the male-side curved contact point portion, the male terminal further comprises planar flat portions extending in opposite direction from both widthwise ends of the male side curved contact point portion, the male-side curved contact point portion and the female-side curved contact point portion extending in an inserting direction of the male terminal into the insertion portion of the female terminal, and a width of the male terminal along a width-wise direction thereof is substantially uniform.

* * * * *